United States Patent [19]

Pope et al.

[11] Patent Number: 5,308,971
[45] Date of Patent: May 3, 1994

[54] MEASUREMENT APPARATUS AND TECHNIQUES FOR ULTRASHORT EVENTS USING ELECTRON PHOTOEMISSION WITH A SUPERLINEAR PHOTOEMISSION ACTIVE ELEMENT

[75] Inventors: Martin Pope; Alexandre Dourandin, both of Brooklyn, N.Y.

[73] Assignee: New York University, New York, N.Y.

[21] Appl. No.: 8,478

[22] Filed: Jan. 25, 1993

[51] Int. Cl.⁵ .................................. H01J 40/14
[52] U.S. Cl. ........................ 250/214 VT; 313/532
[58] Field of Search .......... 250/207, 214 VT, 214 R; 313/532, 537, 542, 103 R, 103 CM

[56] References Cited

U.S. PATENT DOCUMENTS 3,641,343  2/1972  Langer ..................... 250/214 VT
4,461,572  7/1984  Tsuchiya ................... 250/214 VT

OTHER PUBLICATIONS

R. Voltz in "International Discussion of Progress and Progress in Contemporary Radiation Chemistry" (Ed. I Santar) Academia, Prague, 1971, p. 160.
E. J. Bowen et al. "Resonance Transfer of Electronic Energy in Organic Crystals, Physical Chemistry Laboratory", Oxford 1949, A62, pp. 26–31.
Martin Pope et al, "Charge Transfer Exciton State and Energy Levels in Tetracene Crystal", J. Chem. Phys. 1965, 43, p. 3367, p. 3371.
L. Altwegg et al., "Modified Millikan Capacitor for Photoemission Studies," Rev. Sci. Instr. 53, Mar. 1982, p. 332–p. 337.
T. Hirooka et al. "Photoelectron Spectroscopy of Napththacene Crystal in the Vacuum Ultraviolet Region", Chem. Phys. Lett., vol. 18, 1973, p. 390–p. 393.
H. Muller, H. Bassler, "Fluorescence of Crystalline Tetracene Between 4.2 and 300 K, Journal of Luminescence", Dec. 13, 1976, p. 259–p. 263.
Y. Tomkiewicz et al. "Spectroscopic Approach to Energetics of Exciton Fission and Fusion in Tetracene Crystals," J. Chem. Physics, vol. 54, May 1971, p. 4504–p. 4507.
L. Sebastian et al., "Charge Transfer Transitions in Solid Tetracene and Pentacene Studied by Electroabsorption", Chemical Physics 61, 1981 p. 125–p. 135.
R. R. Alfano et al., "Fission Rate of Single Excitons in a Tetracene Crystal Measured with Picosecond Laser Pulses, Optics Communications", vol. 9, No. 4, 1973, p. 388–p. 391.
K. Mizuno et al., "Intermediate Exciton–Phonon Coupling in Tetracene", J. Phys. Soc. of Japan, vol. 53, 1984, p. 2799–p. 2806.
A. J. Campillo et al., "Exciton Interactions in Crystalline Tetracene Studied by Single Picosecond Pulse Excitation," Chemical Physics Letters, vol. 48, 1977, p. 495–p. 500.
E. A. Silinsh "Organic Molecular Crystals," Springer-Verlag, Berlin, 1980, p. 132.

(List continued on next page.)

Primary Examiner—David C. Nelms
Assistant Examiner—Que T. Le
Attorney, Agent, or Firm—Rosen, Dainow & Jacobs

[57] ABSTRACT

Method and apparatus for measuring the time of short events, such as characteristics of a source of short radiation pulses or lifetime of excited states of a sample. The method and apparatus is based on a multi-step photoemission process from an active element target exhibiting superlinear photoemission. A short prompt radiation pulse is used to raise electrons to an excited state, and a following overlapping short probe pulse is used to raise the excited electrons to the vacuum level where they leave the sample, changing its charge state. The number of escaped electrons is measured as a function of the time delay between the prompt and probe pulses to provide the sought after information. Preferably, the charged target is suspended or supported in an electric field, and the voltage needed to restore the charge-changed target to its original position is used.

17 Claims, 4 Drawing Sheets

OTHER PUBLICATIONS

F. Heisel, J. A. Miehe, M. Schott, B. Sepp, Chem. Phys. Lett., 1976, 43, 534.

M. Pope, J. Burgos, "Charge-Transfer Exciton State and Ionic Energy Levels in Anthracene Crystal," Molecular Crystals, vol. 1 1966, p. 395–p. 415.

S. Arnold et al, "Double Quantum External Photoelectric Effect in Crystalline Tetracene", Phys. Stat. Sol.(b) 1979, 94, p. 263–p. 272.

A. George, "An Electrostatic Suspension Method for Determining Photoionization Energies of Solids", Physics Letters, vol. 44A, No. 1, May 7, 1973, pp. 9–10.

Springer Series in Chemical Physics; 46; Ultrafast Phenomena V Proceedings 5th Optical Soc. America Topical Meeting; Edited by G. R. Fleming & A. E. Sieman; Springer-Verlag Berlin Pub. Co., 1986, pp. 123–130.

MEASUREMENT APPARATUS AND TECHNIQUES FOR ULTRASHORT EVENTS USING ELECTRON PHOTOEMISSION WITH A SUPERLINEAR PHOTOEMISSION ACTIVE ELEMENT

This invention relates to measurement apparatus and techniques using electron photoemission for measuring very short events such as light pulses of the order of picoseconds (ps) or less.

BACKGROUND OF INVENTION

Photoemission of electrons from a condensed phase can occur even when the absorbed photon energy is lower than the ionization potential of that phase. In such cases, the mechanisms of photoionization may involve interactions between excited states, excited state-photon absorption phenomena, or multiple photon absorption, giving rise to superlinear intensity dependence of photoelectron yields.

One known apparatus for measuring ps optical pulses is known as a Streak camera. However, it is very costly, and its resolution is about 3-5 ps, so that events lasting 1 ps or less, down into the femtosecond (fs) range, can not be measured.

A less expensive commercially available technique embodied in the (INRAD Autocorrelator available from Interactive Radiation, Inc., of Northvale, N.J.) is based on the superlinear characteristics of certain crystals. In these crystals, light of long wavelength is converted into light of shorter wavelength with an efficiency that varies with light intensity. The measuring device is referred to as an autocorrelator. Using this device, the light pulse width may be determined. There are some drawbacks with this device: (1) The crystals will only work in a limited range of optical wavelengths. They are not suitable for measuring light in the blue spectrum region, for example, or light that will produce fluorescence in the crystal. (2) The angle of polarization of the incident light must be precisely oriented with respect to the optical axes of the crystal, if maximum efficiency is to be realized. The efficiency of conversion accuracy of modeling one pulse shape falls off rapidly with a misorientation. (3) The incoming light of long wavelength must be diverted from the path of the outgoing light of shorter wavelength in order to avoid overloading the response of a photomultiplier that measures the efficiency of conversion to the shorter wavelength. (4) The auto-correlator is still a relatively expensive device.

Several recent papers have been published describing high speed circuit measurements using photoemission sampling. See Springer Series in Chemical Physics 46; Ultrafast Phenomena V Proceedings 5th Optical Soc. America Topical Meeting; Edited by G.R. Fleming & A.E. Siegman; Springer-Verlag Berlin Pub. Co., 1986, pages 123-130. These papers describe associating a sample metal electrode with a circuit part to the measured, and impinging on the metal electrode 500 fs optical pulses. This causes the generation of photoelectrons which are accelerated by an electric field between the sample and an electron collector. Useful information is obtained by measuring at the collector the change of electric current. However, the time resolution of this technique is limited by the transit time of the electrons from the sample surface to the collector. Since it is difficult to make collector-emitter spacings under one micron, measurement of sub-ps wide pulses cannot be done by this known technique.

SUMMARY OF INVENTION

A principal object of the invention is a novel technique for accurately measuring the time of short events.

Another object is a technique and apparatus for measuring short light pulses.

A further object is relatively low cost measurement apparatus for short time events.

Another object of the invention is a relatively low cost short lifetime event measuring apparatus and method.

Still a further object of the invention is measuring apparatus and a method capable of measuring short events of the order of one ps and shorter.

Generally speaking, the method and apparatus of the invention employ photoemission from a target or sample active element, and measure the degree of photoemission at the target or sample. A charge measuring technique is preferred.

The major advantages are:

(1) All substances photoemit electrons in a characteristic wavelength range, so the choice of active elements and testable light pulse wavelengths is greatly increased. Light of wavelength ranging from the deep red to the ultraviolet can be accommodated.
(2) There is no need for careful orientation of the active element with respect to the polarization of the light pulse.
(3) Photoemission takes place in sub-picoseconds, making this phenomenon suitable for light pulse measurements in this time range.
(4) Since charge remaining on the active element is measured, the time resolution is not limited by the time of flight of the photoemitted electron to the external electrode, but by the duration of the photoemission process, which is in the sub-ps range.
(5) The photoemitting device is simpler and cheaper than the autocorrelator previously described.

In one preferred embodiment, a Michelson interferometer type optical layout is employed for generating from a common laser source a succession of two light pulses with a variable time delay. These light pulses are directly impinged upon a target under conditions producing superlinear photoemission. In general, the latter is obtained when at least first and second or more stepped processes, with the second following the first in time, are needed to produce photoemission from the target material. The target is preferably tethered in an enclosure containing electrodes and allowing the target to be charged, and its subsequent loss of charge measured as the time delay between the pulses is varied, and the resultant information used to determine characteristics of the laser light pulses.

In another preferred embodiment, a multi-step photoemission process is employed, in which the decay of an excited state in a crystal sample generated by a prompt pulse is measured by the use of a delayed probe pulse. The sample is preferably suspended in a chamber and negatively-charged initially. The loss of that charge as a result of photoemission is the measured quantity. By measuring the rate of the charge loss, the emission photocurrent is deduced. The loss of charge can be measured by recording the field strength that is required to balance the crystallite against the force of gravity. It is not necessary to have sophisticated sub-picosecond current measuring circuitry to determine lifetime.

Still another preferred embodiment for measuring light pulse characteristics employs a photomultiplier tube (PMT) with, on its first electrode exposed to the light photons, a special material which exhibits superlinear photoemission. Again, dual light pulses, variably delayed, are impinged on the special material of the first electrode. The resulting electron or electrons emitted as a result of the multi-stepped photoemission process are multiplied in the usual way by the remaining PMT electrodes, and eventually collected to provide information about the light pulse source.

The above and further objects, details and advantages of the present invention will become apparent from the following detailed description of preferred embodiments thereof, when read in conjunction with the accompanying drawings.

SUMMARY OF DRAWINGS

FIG. 6 is a partial view of the target of another embodiment of the invention.

DETAILED DESCRIPTION OF PREFERRED EMBODIMENTS

Figure 1:
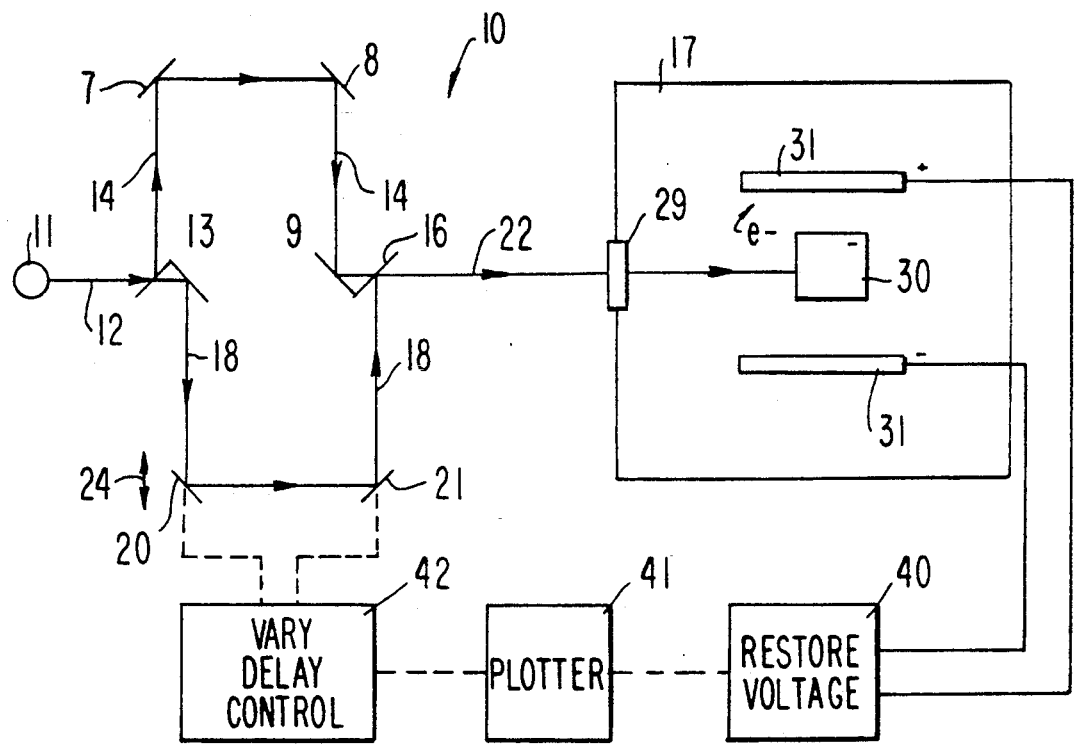
FIG. 1 is a schematic view of one form of apparatus according to the invention.

One embodiment of an apparatus according to the invention is illustrated in FIG. 1 This apparatus has some known similarities from the optical standpoint to the apparatus used in the autocorrelator. Hence, the optical part of the apparatus will only be briefly described as there is much published literature on this subject, and a more detailed description will be given of the electrical part which represents an important improvement over the known equipment.

Referring now to FIG. 1, the apparatus 10 comprises a source 11 of short light pulses. A laser is a typical source, for example, a YAG laser available commercially. As one example, not meant to be limiting, a YAG laser was used that produced a primary beam 12 at a wavelength of 355 nm with a pulse duration (according to the supplier) of about 35 ps. The primary beam 12 is passed through a conventional beam splitter 13, with approximately the first beam half 14, after following a fixed upward path via mirrors 7, 8 and 9, continuing onward through a partially-silvered mirror 16 via path 22 to and through a window 29 of a sample chamber 17. The second beam half 18, following the path shown via mirrors 20 and 21 ultimately rejoins the path 22 of the primary beam at th mirror 16. The path taken by the second half 18 of the beam can be varied to cause a delay in the beam pulses before they reach the sample chamber 17. That delay, relative to the first beam half 14 pulses, can be varied by moving the mirrors 20, 21, jointly, further away from or closer to the splitter 13, indicated by arrow 24. This is a known way of deriving from the same beam two light pulses slightly delayed in time with respect to one another. The direct light pulse 14 is sometimes known as the prompt pulse, and the delayed pulse 18 is known as the probe pulse. In the present case, the wavelengths of the prompt and probe beams are the same, but it is possible to choose another wavelength for the probe beam capable of producing photoemission in the sample.

The sample chamber 17 comprises a modified Millikan chamber (see, for example, Rev. Sci. Instr. 1982, 53, 332). Inside of the chamber a small crystal 30 of a suitable sample material is suspended in an inert atmosphere, for example, of nitrogen at 1 Atm. pressure. The suspension is electrostatically implemented by means of electrodes 31, 31a. The small crystal 30 can be charged triboelectrically, by rubbing contact with other like crystals held in a hopper in plate 31, or by contact with a charged wire. Then applying suitable voltages to the electrodes 31 31a will provide inside the chamber a field which attracts the negatively-charged sample 30 and thus suspends it in space against the force of gravity. When photoemission occurs, electrons are lost and thus the sample 30 loses charge. By measuring the rate of the loss of charge, the emission photocurrent is deduced. The loss of charge can be measured by recording the field strength that is required to balance the crystallite against the force of gravity as is done in the referenced 1982 paper. It is not necessary to have any sophisticated subpicosecond current measuring circuitry to determine lifetimes.

The sample preferably exhibits non-linear photoemission when subjected to light pulses. Practically any metal will exhibit non-linear photoemission at some light intensity and wavelength. If desired, photoemission can be improved by providing known active coatings, such as cesium, to the sample.

The pulse intensities and wavelengths and their time sequencing are selected such that the prompt pulse will excite electrons in the sample from a ground state to some excited state below the vacuum level, so that the prompt pulse alone can either not cause photoemission, or causes photoemission at a reduced rate. However, if while excited electrons occupy the lower excited state, the probe pulse arrives, it will have sufficient energy to raise the excited electrons all the way to the vacuum level causing photoemission to take place, or in the second case increase the photoemission. Thus, the rate of decay of the population of excited states created by the primary beam or prompt pulses is probed by the delayed beam, which interacts with the surviving excited states to produce photoemission.

Figure 2:
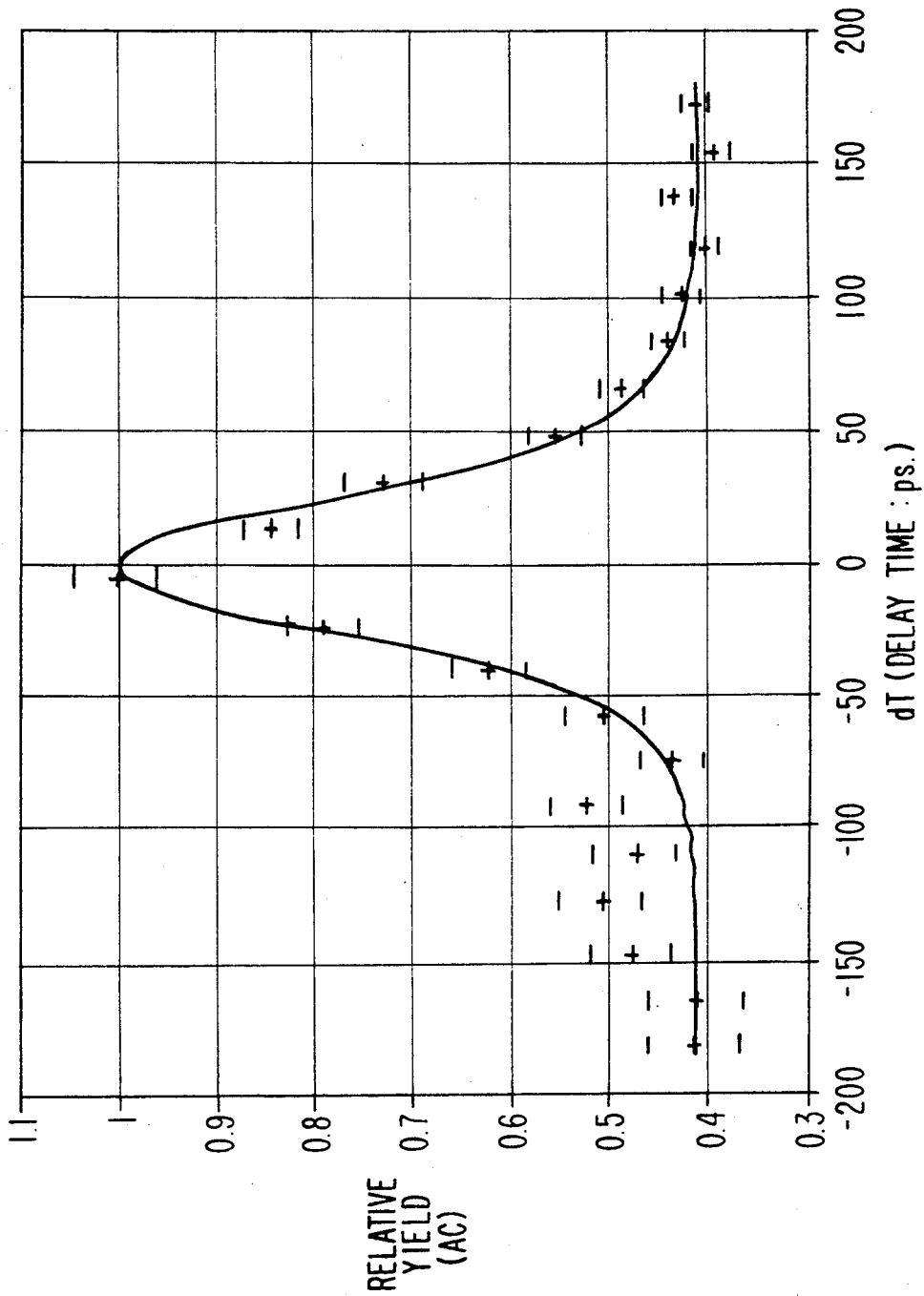
FIG. 2 shows a graph plotting charge loss as a function of probe beam delay time for a tetracene sample with the apparatus of FIG. 1.

In other words, the photoemission from the sample is a function of the surviving excited states of the sample, and thus is also a function of the degree of time overlap of the prompt and probe pulses. The loss of negative charge will cause the less-negatively charged sample 30 to move toward the negatively-biased lower electrode 31a due to the fields no longer balancing the force of gravity. The voltage applied to the electrodes can be changed via a suitable control circuit 40 to restore the sample 30 to its suspended position. The amount of that voltage change can then be stored for the current position of the mirrors 20, 21 controlled by control 42. By plotting field strength or the voltage required to balance the sample against the prompt-probe time delay, one arrives at a characteristic curve as illustrated in FIG. 2. The mathematics showing how this is done is described in Appendix A, with references indicated by brackets in Appendix B. In this particular case, the object was to measure the lifetime of a charge-transfer exciton state in a sample of single crystal tetracene. The right half of the curve of FIG. 1 covering positive delay times express the typical lifetime characteristic expected in such a dual-step photoemission process. With this apparatus, the effective lifetime of the tetracene charge-transfer exciton state was measured to be ~20 ps. To our knowledge, there is no other equipment of comparable cost that is capable of making such short lifetime measurements with the same accuracy, especially with respect to certain materials, and especially in the ultra violet (UV) range and for organic crystals.

The equipment of the invention is not only useful for making measurements of properties of the sample material, as in the tetracene case. Knowing the lifetime of the first excited states of the sample material, one can calculate in a similar manner properties of the light source. For example, in the experiment conducted with a pentacene sample, we were able to calculate that the YAG laser light source 10 produced pulses having a width, not of 35 ps as stated by the laser supplier, but actually of about 20 ps. Thus, the apparatus of the invention will generally be useful to characterize light sources generating short-width pulses for use, for example, in communications via optical fibers.

Figure 3:
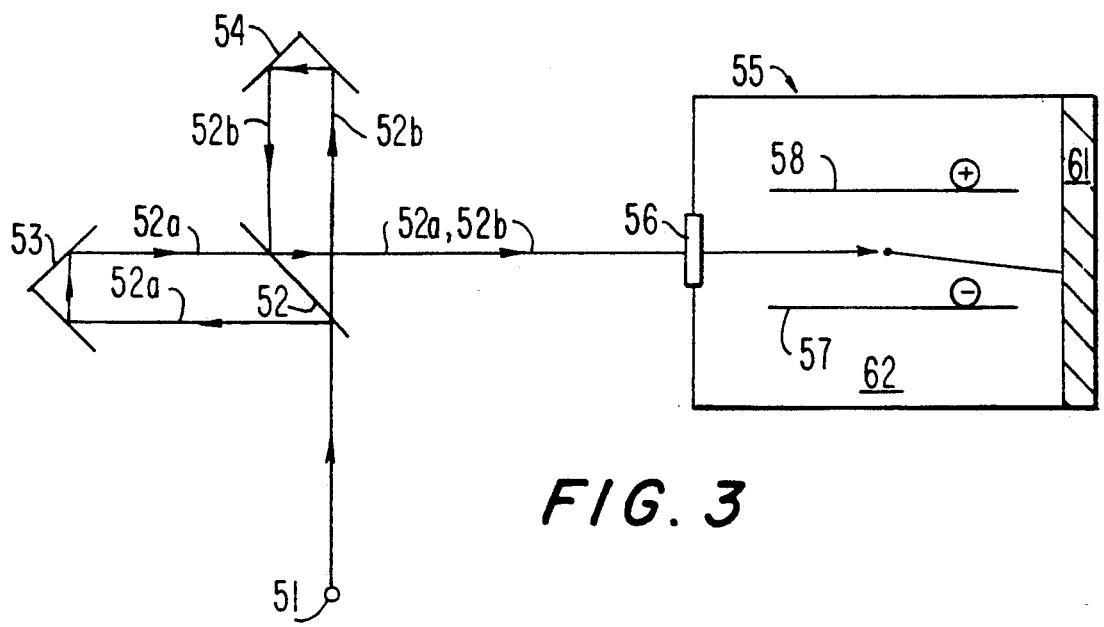
FIGS. 3 and 4 are side and top views respectively of another form of apparatus according to the invention especially for measuring light pulse characteristics.
Figure 5:
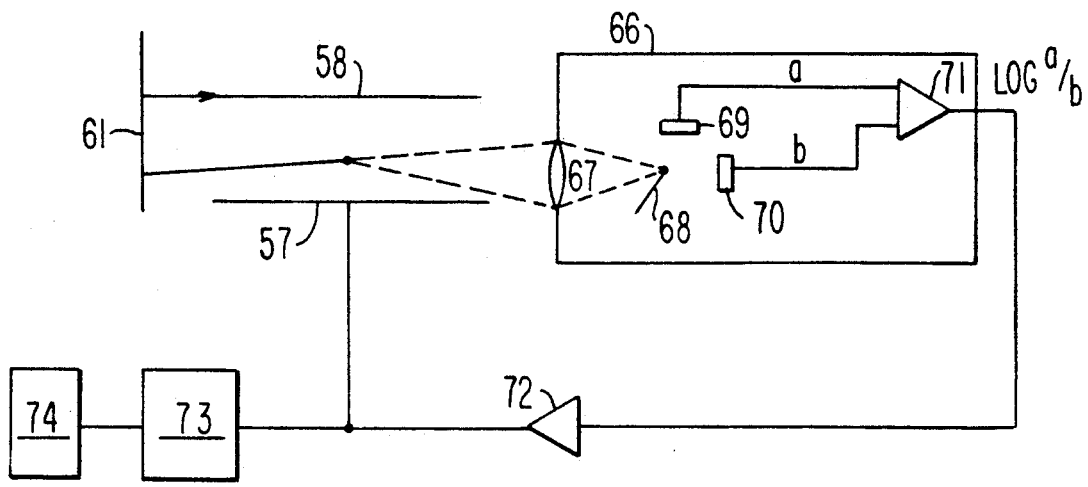
FIG. 5 is a schematic side view of the target for the apparatus of FIGS. 3 and 4 together with a schematic of one form of target position controller.
Figure 7:
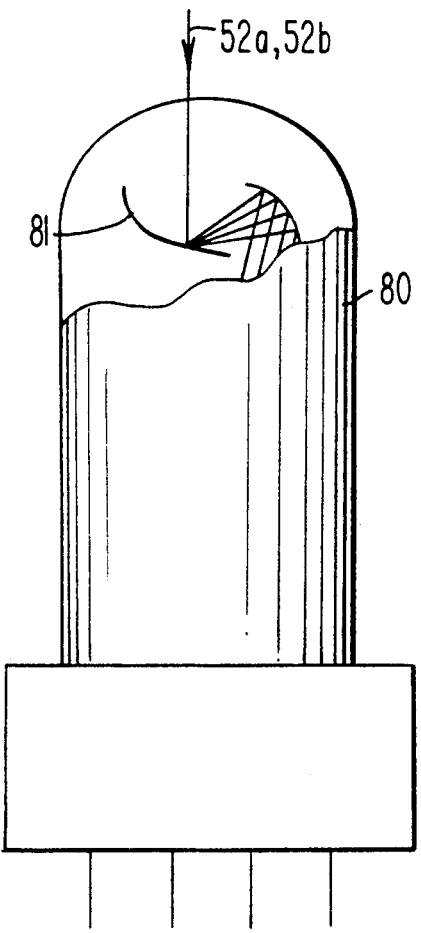

FIGS. 3 14 5 illustrate a preferred embodiment of the invention for measuring the characteristics of short-width pulses.

From a source 51 light pulse 49 strikes a partially reflective mirror 52 and approximately half of the light 52a is reflected to a fixed corner cube mirror 53 which reflects the light 52a back through mirror 52 and thence through a transparent window 56 within a hermetically sealed chamber 55 filled for example with an inert atmosphere 62, such as pure nitrogen, and strikes a target 59. The remaining half of the light pulse 52b that passes through mirror 52 strikes a movable corner cube mirror 54 which, after a measured delay, returns the light to mirror 52, and thence along the path 52a through window 56 to the target 59.

The target active element 59 is negatively charged by means, for example, of a suitable retractable wire (not shown), and is attracted to a positively charged electrode 58 causing a quartz insulating elastic fiber 60, mounted on an insulating wall 61 and carrying the target 59, to be bent into a state of tension. The charging is adjusted so that the target 59 is brought to a specific point by the application of a prescribed voltage, so that the starting point for target 59 is identical for each trial. Electrode 57 has a negatively-charged potential provided to it. It should be understood that the relative orientation of the fiver and electrodes is not critical. Thus, the electrodes and fiber could be vertical.

The measurement begins with the movable mirror 54 positioned so that the path distance taken along 52a is equal to that along 52b. Under these conditions, the light pulses that are divided into approximately equal parts at mirror 52 arrive simultaneously at the target 59. As the movable mirror 54 is moved away from mirror 52, the path 52b becomes longer than path 52a, thus introducing a time delay in the arrival of pulse 52b after pulse 52a. The pulse 52a will be referred to as the prompt pulse, and the pulse 52b the delayed pulse.

The light pulses 52a and 52b strike the target 59 for accurately measured equal time intervals at each position of the movable mirror 54. The time interval is typically of the order of seconds. Since each light pulse produces photoemission, there is an integration of effect over the duration of the measuring interval. These light pulses produce photoemission by a superlinear process, which can be multiphoton absorption, or the interaction of a photon with a short-lived excited state.

The emitted electrons reduce the charge on target 59, and cause the quartz fiber 60 to relax back to its tension-free position.

Figure 4:
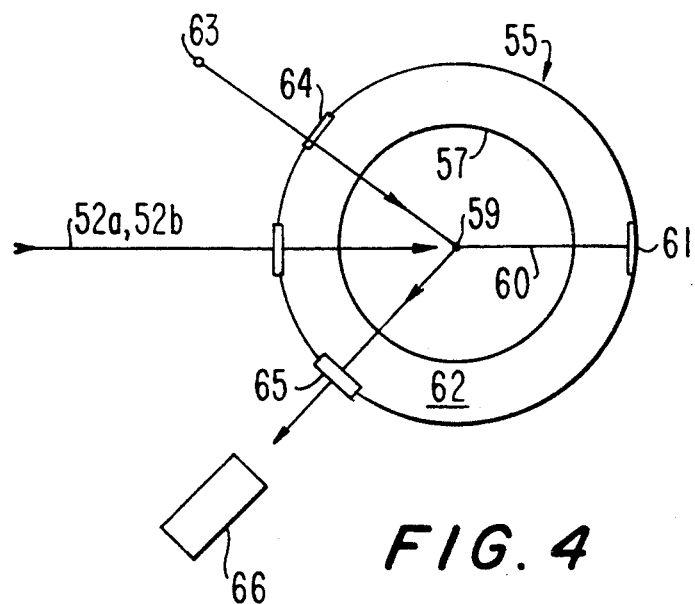

The top view illustrated in FIG. 4 is taken with the cover and top plate 58 of the enclosure 55 removed to show the interior, and also to show a light source 63, e.g., a He-Ne laser, for illuminating the target, as part of the charge-measuring system, via a window 64 in the enclosure 5. A second window 65 is provided for reflected light from the active element 59 to a camera 66 for detecting the position of the target and transmitting feedback information to electrode plates 57 and 58 to maintain the target position.

As shown in FIG. 4, the target 59 is illuminated throughout by means of the He-Ne laser of relatively low intensity. The illuminated target 59 is kept within the view of the camera 66, which is capable of detecting the slightest change in the position of the target 59. This is accomplished as shown in FIG. 5.

Referring to FIG. 5, the image of target 59 is focused by lens 67 of camera 66 to the edge of a mirror 68, with the result of causing approximately one-half of the reflected light to fall, respectively, on first 69 and second 70 photodiodes. If the target 59 moves up in response to a loss of electrons, its image will fall entirely on mirror 58, and reflect entirely into the first photodiode 69. This alters the ratio of the signals a/b, which is recorded by a log differential amplifier 71. The amplifier 71 alters the voltage generated by a voltage supply at 72, increasing the positive potential at electrode 58, restoring the target 59 to its original position. The voltage at the electrode 58 is recorded by a voltmeter 73, and the data are computed by a computer 74, which calculates the photoemissive yield during the time interval corresponding to the particular time delay produced by the position of the movable mirror 4 in the apparatus.

At the termination of the series of measurements at each time delay, a response similar to that shown in FIG. 2 will be obtained, from which it is a straightforward process to calculate the duration of the light pulse from the source 51 in FIG. 3.

FIG. 6 shows a further embodiment. The optical system (not shown) is similar to that illustrated in FIG. 3. The only change is that the enclosure 55 and camera 66 is replaced by a PMT 80, shown schematically, with a special first electrode 81. The PMT 80 is otherwise the same as a conventional PMT. The output signal from the PMT would in this case be directly used to supply information regarding light pulse duration from the received light pulses 52a, 52b.

In the measurement of short light pulses, the active element (target) material for the special first electrode 81 of FIG. 6 should have photoemission properties with a lifetime much shorter than the duration of the light pulses, as the photon interaction traces out the characteristics of the largest lived state. Most any metal will be a suitable target material for measuring sub-ps pulses. As before, the target 81 must exhibit superlinear behavior and in general will have an energy bandgap or work function that will exceed the photon energy, so that the second delayed pulse is necessary to produce or increase the photoemission. Again, most metals will qualify for measuring sub-ps light pulses characteristics.

In summary, the method for measuring ultrafast (sub-picosecond) events according to the present invention provides very high sensitivity at a relatively low cost. Among the advantages offered are:

(1) It has time resolution which is the same or better than the second harmonic generating autocorrelator; while the interaction between photons has the same time constant, the new method deal with molecules (if the target is realized as a monomolecular layer) not with the crystal, which is why it has no light dispersion problems.

(2) To our knowledge, this is the only device which can measure ultrafast events with subpicosecond time resolution not only in the red or green part of the spectrum, but also in the blue and ultraviolet parts of the spectrum.

(3) The apparatus of the invention can measure the real autocorrelation function, because other autocorrelators based on SHG crystals omitted dependence on the angle between crystallographic axes and light polarization and propagation (multiplication of tensor of polarizability of the crystal and tensor of light electromagnetic wave), as well as influence of fundamental radiation and fluorescence.

(4) The molecular nature of the new method make it possible to realize any of the existing optical geometries of autocorrelators, improving significantly their technical parameters.

(5) The new method eliminates the necessity of using not only the SHG crystal itself, but also crystal tilt, crystal translation system, and alignment control system, making the new system much easier to operate. The new method of the invention does not need filters to cut fundamental radiation and fluorescence.

(6) The charge-enclosure embodiment of FIGS. 3-5 is the most sensitive version. In the limiting case of interaction of two photons, which produce one emitted electron, it can be detected by the apparatus of FIG. 5. The threshold of sensitivity is at least one thousand times better than in any single photon counter.

(7) Besides measuring light pulse width, the new method can be applied for measuring the lifetime of the excited states in gases, liquids and solid states. The advantages of the new method can be applied to the investigation of organic crystals. When the spectral band of the transition between two excited states is overlapped by another transition (which is most common in biochemical objects and crystals), to our knowledge, only the method of the invention can solve this problem and give information about the lifetime of each state. The experiments described above with tetracene are a good example.

In practicing the invention, it is important that there be a proper relation between the sample excited state lifetimes and the pulse widths of the prompt and probe beams. Generally, that relation requires the same orders of magnitude or less. For example, to measure picosecond lifetimes requires picosecond pulse widths or less of the primary beam. Conversely, to measure picosecond properties of the light source requires a sample material with sub-picosecond lifetimes. The same applies to femtosecond times of the light pulses when femtosecond lifetimes are to be measured.

In the operation of the systems described, as explained, a succession of readings are taken while the delay between the prompt and probe pulses is varied. This can be done following one initial charging of the target, or the target can be re-charged to an initial state before each set of readings associated with a particular delay established between the prompt and probe pulses is taken.

It will be appreciated that the invention is not limited to the specific ways described for measuring the charge loss by the sample. Any suitable method will do. Thus, the invention is not limited to the particular Milliken chamber described, and other variations within the principles set forth herein will be evident to those skilled in the art. What was said above applies with equal force to other kinds of apparatus for generating slightly-delayed light pulses, or for measuring small variations in the charge state of an object. Further, other light sources capable of exciting photoemissions can be substituted for those described. Moreover, the circuitry in the controls 40 and 41 are well-known in the art and need not be further described. See, for example reference [4] in Appendix B.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. This scope of the invention is indicated by the appended claims rather than by the foregoing description.

This work was supported by Department of Energy (DOE) Contract No. DEFG-02-86ER-6045, and the DOE may have certain rights with respect to any patent issuing from this application.

What is claimed is:

1. A method of measuring characteristics of short duration light pulses from a light source comprising:
    (a) providing an active element exhibiting superlinear photoemission when impacted by photons,
    (b) impinging on the active element photons from first and second light pulses derived from the light source, the combination of said photons being capable of causing or increasing photoemission from said active element, thereby changing its charge state,
    (c) measuring the changed charge state while varying the time delay between the first and second pulses to obtain an indication of the light pulses' characteristics.

2. The method of claim 1, wherein said active element comprises material whose work function is much larger than the photon energy.

3. Measurement apparatus comprising:
    a) a target material exhibiting superlinear electron photoemission when irradiated,
    b) a source of prompt radiation pulses directed at said target and capable when absorbed by the target of raising electrons in the target from a first state to a second excited state at an energy level higher than that of said first state,
    c) a source of probe radiation pulses directed at said target and capable when absorbed by the target while electrons occupy said second excited state of raising said electrons to a third excited state wherein the electrons are capable of escaping from the target thereby changing the second excited state of the target,
    d) means coupled to the target for measuring its charge state thereby providing an indication of the pulse duration of the radiation pulses or the lifetime of the second excited state of the target material.

4. Apparatus of claim 3, further comprising means for deriving the probe and prompt pulses from a common source of pulses, and means for varying the delay of probe pulse impingement on the target relative to prompt pulse impingement.

5. Apparatus of claim 3, further comprising a sealed enclosure having a transparent portion for radiation pulses, means for supporting said target within said enclosure, means for a change in its charge state.

6. The apparatus of claim 5, wherein the detecting means comprises a second light source for illuminating the target, plural light detectors, and means for varying the light intensity falling on the light detectors in response to a changing position of the target.

7. The apparatus of claim 6, further comprising a differential amplifier connected to the light detectors.

8. The apparatus of claim 6, wherein the detecting means comprises a PMT whose first electrode has a material whose work function exceeds that of the photon energy.

9. A method of measuring radiation pulse parameters or the excited state lifetimes of a target material, comprising the steps:
   a) provided a target material exhibiting superliner electron photoemmision when irradiated,
   b) impinging on the target a pulse of prompt radiation so as to raise electrons from a ground state to a first higher excited state,
   c) while electrons occupy the excited first state, impinging on the target a pulse of probe radiation capable of raising electrons occupying the excited first state to its vacuum state thereby causing emission of electrons from the target causing the target to become more positively charged to a higher level,
   d) measuring said higher level assumed by the target as an indication of the pulse widths of the impinging radiation or of the lifetime of the first excited states.

10. Measurement apparatus comprising:
    a) a sample material exhibiting non-linear electron photoemission when irradiated,
    b) a source of prompt radiation pulses directed at said sample and capable when absorbed by the sample of raising electrons in the sample from a ground state to a first excited state at an energy level higher than that of said ground state,
    c) a source of probe radiation pulses directed at said sample and capable when absorbed by the sample while electrons occupy said first excited state of raising said electrons to a second excited state wherein the electrons are capable of escaping from the sample thereby changing the charged state of the sample in a positive direction,
    d) means coupled to the sample for measuring its charge state thereby providing an indication of parameters of the radiation pulses or properties of the sample material.

11. Apparatus of claim 10, further comprising means for deriving the probe and prompt pulses from a common source of pulses, and means for varying the delay of probe pulse impingement on the sample relative to prompt pulse impingement.

12. Apparatus as claimed in claim 10, wherein the means coupled to the sample for measuring its charge comprises a sample chamber having a window for receiving the pulses, electrodes within the chamber, means connected to the electrodes for suspending or supporting a sample within the chamber against the force of gravity.

13. Apparatus as claimed in claim 12, wherein the means for suspending includes electrodes and means for applying potentials to the electrodes to create an electric field within the chamber.

14. Apparatus as claimed in claim 13, further comprising means connected to the electrodes for determining the potential changes necessary to maintain the ground state of the sample.

15. A method of measuring radiation pulse parameters or properties of a sample material, comprising the steps:
    a) providing a sample material exhibiting non-linear electron photoemission when irradiated,
    b) impinging on the sample a pulse of prompt radiation so as to raise electrons from a ground state to a higher first excited state,
    c) while electrons occupy the first excited state, impinging on the sample a pulse of probe radiation capable of raising electrons occupying the first excited state to its vacuum state thereby causing emission of electrons from the sample causing the sample to lose negative charge,
    d) thereafter measuring the charge assumed by the sample as an indication of parameters of the impinging radiation or of the lifetime of the first excited states.

16. The method of claim 15, wherein the charge-measuring step comprises:
    (i) before impinging radiation pulses on the sample initially charging the sample to a predetermined charge and providing an electric field to position the sample in space,
    (ii) after impinging prompt and probe radiation pulses causing the sample to lose charge, measuring the changed electric field needed to restore the sample to its original position.

17. The method of claim 15, wherein the delayed impingement of the probe radiation pulse is varied in delay time, and the measurement of changed electric field is repeated.

* * * * *

UNITED STATES PATENT AND TRADEMARK OFFICE
CERTIFICATE OF CORRECTION

PATENT NO. : 5,308,971
DATED : May 3, 1994
INVENTOR(S) : Martin Pope and Alexandre Dourandin It is certified that error appears in the above-indentified patent and that said Letters Patent is hereby corrected as shown below:

Column 1, line 7, after the title insert:
--This invention was made with U.S. government support awarded by the Department of Energy, Grant No. DEFG-02-86ER-60405. The U.S. government has certain rights in this invention.--

Signed and Sealed this

Eleventh Day of July, 1995

*Attest:*

BRUCE LEHMAN

*Attesting Officer*  *Commissioner of Patents and Trademarks*